United States Patent [19]

Hänsel et al.

[11] Patent Number: 5,143,987
[45] Date of Patent: Sep. 1, 1992

[54] POLYURETHANE REACTIVE ADHESIVE COMPOUNDS CONTAINING FINELY DISPERSED POLYMERS

[75] Inventors: Eduard Hänsel, Wuppertal; Heinrich Hess, Cologne; Günter Arend, Dormagen; Gerhard Grögler, Leverkusen; Richard Kopp, Cologne, all of Fed. Rep. of Germany

[73] Assignee: Bayer Aktiengesellschaft, Leverkusen Bayerwerk, Fed. Rep. of Germany

[21] Appl. No.: 577,979

[22] Filed: Sep. 5, 1990

[30] Foreign Application Priority Data

Sep. 9, 1989 [DE] Fed. Rep. of Germany ....... 3930138

[51] Int. Cl.⁵ ............... C08F 210/00; C08F 216/00; C08F 220/00
[52] U.S. Cl. .................. 525/458; 525/452; 525/453; 525/455; 525/457
[58] Field of Search ............ 525/458, 124, 452, 453, 525/455, 457; 521/137, 125, 126; 156/307.3; 528/44, 272, 68; 428/262, 425, 426

[56] References Cited

U.S. PATENT DOCUMENTS

| | | | |
|---|---|---|---|
| 4,542,165 | 9/1985 | Kumata et al. | 528/137 |
| 4,543,393 | 9/1985 | Blum et al. | 525/124 |
| 4,595,445 | 6/1986 | Hombach et al. | 528/44 |
| 4,985,534 | 1/1991 | Heinz et al. | 528/272 |

*Primary Examiner*—John Kight, III
*Assistant Examiner*—D. Truong
*Attorney, Agent, or Firm*—Joseph C. Gil; Godfried R. Akorli

[57] ABSTRACT

The present invention is directed to a polyurethane reactive adhesive compound comprising:

A) one or more polyisocyanates having an inactivated particle surface,
B) at least one isocyanate reactive compound having a molecular weight $MG_w$ greater than 400, and
C) finely dispersed polymer particles, wherein the polymer is solid at temperatures below 70° C. and has a molecular weight $MG_w$ of at least 3000.

10 Claims, No Drawings

POLYURETHANE REACTIVE ADHESIVE COMPOUNDS CONTAINING FINELY DISPERSED POLYMERS

BACKGROUND OF THE INVENTION

The present invention relates to polyurethane reactive adhesive compounds containing finely dispersed polymers and to a process for bonding substrates using such adhesive compounds.

The capacity of inactivated polyisocyanates when mixed with suitable hydroxy functional or aminofunctional compounds, to form mixtures which will remain stable in storage at room temperature for more than six months in the disperse phase has been described in Houben-Weyl, "Methoden der organischen Chemie", Volume 20/2, Thieme-Verlag, Stuttgart 1987. The polyisocyanates may be mixed with suitably selected special hydroxy functional and/or aminofunctional reactants to form mixtures which are stable in storage at room temperature and which can be cured as described in German Auslegeschrift 3,403,499 to form adhesives with very high bond strength. These heat-curable one-component polyurethane adhesive systems which have been prepared from inactivated polyisocyanates and hydroxy-functional and/or amino-functional compounds are stable in storage at room temperature often contain, in their preferred formulations, expensive components which are difficult to synthesize.

Moreover, when these mixtures are used for bonding vertical joints or for forming "overhead bonds" necessitated by the conditions of assembly, the relatively low viscosity of the mixtures may impair the continuity of the adhesive joints.

It was therefore an object of the present invention to provide improved systems based on polyurethane reactive adhesive compounds containing inactivated polyisocyanates.

DESCRIPTION OF THE INVENTION

The present invention is directed to polyurethane reactive adhesive compounds comprising:
A) one or more polyisocyanates having an inactivated particle surface,
B) at least one isocyanate reactive compound having a molecular weight $MG_w$ greater than 400,
C) finely dispersed polymer particles, where the polymer is solid at temperatures below 70° C. and has a molecular weight $MG_w$ of at least 3000,
D) optionally one or more chain lengthening agents having molecular weights below 400,
E) optionally conventional polyurethane catalysts and
F) optionally conventional inorganic additives.

The polymer particles preferably have a maximum particle diameter of less than 200 µmeter ("µm"). The maximum particle diameter is defined as the diameter of those particles which can still pass through a sieve of a given mesh. For a description of the sieving process and determination of the grain size, see Ullmann "Enzyclopädie der technischen Chemie", Volume 5, page 738, Verlag Chemie, Weinheim.

In a particularly preferred embodiment, the particles have a maximum diameter of less than 150 µm. Preferably at least 99% by weight of the particles have a diameter of at least 0.25 µm, and, in particular, at least 0.5 µm.

The polymers described below are particularly suitable for use as the polymer particles:

1) linear hydroxypolyurethanes having molecular weights above 20,000 and produced by reacting i) aliphatic diols and/or hydroxypolyethers based on ethylene oxide and/or propylene oxide with ii) aromatic polyisocyanates such as methylenebis(phenyl isocyanate) and toluene diisocyanate;

2) copolyamides, in particular based on caprolactam and/or lauryl lactam and dimeric fatty acids and/or aliphatic dicarboxylic acids; particularly suitable copolyamides have a softening range of from 80° C. to 120° C. (for further details concerning copolyamides, see also Kunststoff Handbuch, Volume VI, Hanser-Verlag, Munich 1966, pages 356 et seq);

3) copolymers of α-olefines, preferably copolymers of ethylene with vinyl acetate, and in particular with a vinyl acetate content of from 8 to 80% by weight, and in particular from 18 to 55% by weight, and with average molecular weights above 40,000;

4) polyvinyl alcohols obtainable by the hydrolysis or partial hydrolysis of polyvinyl esters as described by K. Noro in "Polyvinyl Alcohol", Wiley & Sons, New York 1973; the degree of hydrolysis of partially hydrolyzed polyvinyl esters may range from 1 to 100% of the ester functions present;

5) polyvinyl formals and acetals, preferably polyvinyl butyrals having hydroxyl functions (see "Polyvinyl Alcohol", Wiley & Sons, New York 1973) with a degree of acetalisation of up to 80%;

6) substantially linear polyesters, in particular based on aromatic dicarboxylic acids; saturated copolyesters having softening temperatures of from 70° C. to 150° C. as described in "Schmelzklebstoffe" by R. Jordan, publishers Hinterwaldner Verlag, Munich 1985, are particularly preferred;

7) copolymers of acrylonitrile, butadiene and styrene having a polybutadiene contents of from 0.1 to 50% by weight;

8) polyvinyl chloride and copolymers of polyvinyl chloride;

9) polyethylene, and, in particular chlorosulphonated polyethylene;

10) vinyl chloride/vinyl acetate copolymers, which may, if desired, be saponified; and, 11) styrene/acrylonitrile copolymers.

The advantage of the polymer particles according to the invention as additives to reactive adhesives lies in the improvement in bond strength and/or increase in heat resistance of systems filled with such polymer particles when compared with the reactive adhesives which do not contain such particles.

The proportion by weight of polymer particles in the mixtures according to the invention is preferably from 0.1 to 70% by weight, based on the sum of components A), B), D), E) and F). If the polymers of the particles contain more than 1% by weight of hydroxyl groups, the mixtures preferably have a stoichiometric ratio of molar mass of all activatable isocyanate functions to all hydroxy and/or amino functions of the total mixture within the limits of from 3:1 to 1:3, and preferably from 1.66:1 to 0.66:1.

Preferred polyisocyanates A) have melting points above 40° C., preferably above 80° C. Specific examples include 1,5-naphthalene diisocyanate, dimeric 4,4'-diisocyanatodiphenyl methane, dimeric 2,4-diisocyanatotoluene, 3,3'-diisocyanto-4,4'-dimethyl-N,N'-diphenyl urea and N,N'-bis-[4-(4-or 2-isocyanatophenylmethyl)-phenyl]-urea. Dimeric 2,4-diisocyanatotoluene is particularly preferred.

The polyisocyanates are preferably inactivated by the action of, for example, aliphatic polyamines having molecular weights of from 32 to 399 and optionally by the action of aliphatic polyamines having molecular weights of from 400 to 8000. The following are examples of such polyamines: ethylene diamine, 1-amino-3,3,5-trimethyl-5-aminomethyl cyclohexane, 3,3'-dimethyl-4,4'-diaminodicyclohexylmethane, diethylene triamine and methyl nonane diamine.

The following are examples which may also be used as stabilizers for inactivation: hydrazine, mostly in the form of hydrazine hydrate, $C_1$-$C_6$-alkyl-substituted hydrazines, e.g. methyl hydrazine, ethyl hydrazine, hydroxyethyl hydrazine or N,N'-dimethyl hydrazine and compounds containing hydrazide end groups, e.g. carbodihydrazide, ethylene-bis-carbazic ester, β-semicarbazido-proprionic acid hydrazide or isophorone-bis-semicarbazide. Other inactivating agents are described in German Auslegeschriften 3,230,757 and 3,112,054.

Open chained, mono or bicyclic amidines or guanidines which are free from isocyanate reactive hydrogen atoms may also be used as stabilizers for the isocyanate component. The following are examples of such compounds: tetramethyl guanidine, pentamethyl guanidine, 1,2-dimethyltetrahydropyrimidine, 1,8-diaza-bicyclo[5,4,0]-undec-7-ene and 1,5-diaza-bicyclo[4,3,0]non-5-ene. Further examples of such amidines are described in German Auslegeschrift 3,403,500.

In one particularly preferred embodiment, the polyisocyanate A) is stabilized with 3,3'-dimethyl-4,4'-diaminodicyclohexyl methane, methyl nonane diamine or 2,5-dimethyl piperazine. Relatively high molecular weight diamines or polyamines may be used in addition, for example amines obtained by the amination of polyoxyalkylene glycols with ammonia according to German patent 634,741 or U.S. Pat. No. 3,654,370.

Storage stable suspensions of inactivated polyisocyanates A) in hydroxyfunctional and/or aminofunctional compounds in which the compounds B) serve as suspension medium are particularly preferred. In one preferred embodiment, the ratio of components A) and B) is chosen to provide one equivalent of isocyanate group to ⅓ to 3 equivalents of isocyanate reactive groups.

Polyesters, polyethers, polythioethers, polyacetals, polycarbonates and polyester amides are preferred isocyanate reactive compounds B. Examples are described, for example, in German Auslegeschriften 2,920,501, 2,854,384 and 3,230,757.

Polyamine compounds and polyhydroxyl compounds already containing urethane or urea groups and modified or unmodified natural polyols such as castor oil, carbohydrates or starch may also be used. Products of addition of alkylene oxides to phenol formaldehyde resins or to urea formaldehyde resins may also be used in the process according to the invention.

Polyhydroxyl compounds containing high molecular weight polyadducts or polycondensates or polymers in a finely dispersed or a dissolved form (filled polyols) are optionally also used. The aggregate state of these filled polyols is liquid. Polyhydroxyl compounds containing polyadducts are obtained when polyaddition reactions (e.g. reactions between polyisocyanates and amino functional compounds) or polycondensation reactions (e.g. between formaldehyde and phenols and/or amines) take place in situ in the abovementioned compounds containing hydroxyl groups.

Polyhydroxyl compounds modified by vinyl polymers such as are obtainable e.g. by the polymerization of styrene and acrylonitrile in the presence of polyethers or polycarbonate polyols are also suitable for the process according to the invention. Examples of such compounds suitable for the invention are described, for example, in High Polymers, Volume XVI "Polyurethanes, Chemistry and Technology" by Saunders-Frisch, Interscience Publishers, New York, London, Volume I, 1962, pages 32 to 42 and pages 44 and 54 and Volume II, 1964, pages 5 to 6 and 198 to 199, and in Kunststoff Handbuch, Volume VII, Vieweg-Hochtlen, Carl-Hanser-Verlag, Munich 1966, e.g. on pages 45 to 71, and in Offenlegungsschriften 2,854,384 and 2,920,501.

Polymers containing hydroxyl groups e.g. copolymers of olefinically unsaturated monomers and olefinically unsaturated monomers containing active hydrogen are also suitable polyols. They are described, for example, in European patent 62,780. They are preferably used for sealing filling or adhesive compounds or underseals for floors.

The above mentioned polyols B) may be modified by a preliminary reaction with a subequivalent amount of polyisocyanate.

The polyamines may be liquid, low molecular weight and/or relatively high molecular weight, aromatic and/or aliphatic polyamines, in particular with a molecular weight of from 400 to 6000. Relatively high molecular weight aliphatic polyamines are particularly preferred, optionally with minor quantities of low molecular weight aliphatic polyamines.

In a preferred embodiment, relatively high molecular weight polyamino compounds containing aliphatic amino groups and having an equivalent weight in the range of from 200 to 3000, preferably from 300 to 2000, are used. Such amines include the compounds obtained by reductive amination of polyoxyalkylene glycols with ammonia as described in Belgian patent 634,741 and U.S. Pat. No. 3,654,370. Other relatively high molecular weight polyoxyalkylene polyamines may be prepared by methods listed in the publication "Jeffamine, Polyoxypropylene Amines" by Texaco Chemical Co., 1978; Such methods include the hydrogenation of cyanoethylated polyoxypropylene glycols (German Auslegeschrift 1,193,671), by the amination of polypropylene glycol sulphonic acid esters (U.S. Pat. No. 3,236,895), by the treatment of a polyoxyalkylene glycol with epichlorohydrin and a primary amine (French patent 1,466,708) or by the reaction of isocyanate prepolymers with hydroxyl group-containing enamines, aldimines or ketamines followed by hydrolysis (German Auslegeschrift 2,546,536). Suitable relatively high molecular weight aliphatic diamines and polyamines also include the polyamines obtainable by alkaline hydrolysis of isocyanate prepolymers (from aliphatic diisocyanates) with bases as described in German Auslegeschriften 2,948,419, 3,039,600, and 3,112,118, and European patents 61,627, 71,132 and 71,139.

The polyamines prepared by the process according to German Auslegeschrift 2,948,419 and the other documents cited thereafter are preferably polyether polyamines. However, polyester-, polyacetal-, polythioether and polycaprolactone- polyamines, preferably difunctional or trifunctional polyamines, containing urethane groups (from the reaction of the corresponding relatively high molecular weight polyhydroxyl compounds with excess polyisocyanates) and carrying amino groups on the residue of the (previous) polyisocyanate may also be used. The relatively high molecular weight polyamines may, however, also be prepared by other processes, e.g. by the reaction of isocyanate prepolymers with excess quantities of diamines as described in German Auslegeschrift 1,694,152. Another method of synthesis described in French patent 1,415,317 is carried out by conversion of the isocyanate prepolymers with formic acid into the N-formyl derivatives, followed by saponification.

These relatively high molecular weight, aliphatic polyamines may be used both as stabilizers for the polyisocyanate component and a components serving as dispersion medium and as reactive components B).

Low molecular weight chain lengthening agents D) may also be used. Particularly preferred are low molecular weight aromatic diamines in the molecular weight range of from 108 to 399. These may contain the amino groups attached to heterocyclic groups having an aromatic character.

Conventional polyurethane catalysts E) may also be used. Tertiary amines or metal catalysts are particularly effective. Examples of these catalysts include tertiary amines such as triethylamine, tributylamine, N,N,N',N'-tetramethylethylene diamine, 1,4-diaza-bicyclo-(2,2,2)-octane, N,N-dimethyl benzylamine and N,N-dimethyl cyclohexylamine. The organic metal compounds used as catalysts may in particular organic tin compounds and lead compounds. The organic tin compounds are preferably tin(II) salts of carboxylic acids, such as tin(II)-ethyl hexoate and tin(II) stearate and the dialkyl tin salts of carboxylic acids, e.g. dibutyl tin dilaurate or dioctyl tin diacetate. The organic lead compounds are preferably lead(II) salts of carboxylic acids, such as lead(II)-naphthenate, lead(II)ethyl hexoate or lead(II)-stearate but also, for example, lead(II)bis-diethyldithiocarbamate. Other examples of catalysts to be used according to the invention and details concerning the mode of action of the catalysts are described in Kunststoff-Handbuch, Volume VII, published by Vieweg and Hochtlen, Carl-Hanser-Verlag, Munich 1966, e.g. on pages 96 to 102, and in German Auslegeschrift 3,230,757. When used, the catalysts are generally used in a quantity from about 0.001 to 10% by weight, based on the total composition.

The following are examples of inorganic additives F) optionally used: dyes or pigments and fillers such as heavy spar, chalk, quartz powder, kieselguhr, silica gel, precipitation silicas, pyrogenic silicas, gypsum, talc, active charcol, carbon black and metal powders.

The following conventional polyurethane additives may also be used: reaction retarders, e.g. substance which are acid in reaction such as hydrochloric acid, organic acid halides or organic acids; flame retardants of known type, e.g. tris-chloroethyl phosphate or ammonium phosphate and polyphosphates: stabilizers against aging and weathering such as phenolic antioxidants and light protective agents; plasticizers and fungistatic and/or bacteriostatic substances.

Examples and details concerning the use and mode of action of these various conventional additives are described in Kunststoff-Handbuch, Volume VI, published by Vieweg and Hochtlen, Carl-Hanser-Verlag, Munich 1966, e.g. on pages 103 to 113, and in German Auslegeschriften 2,854,384 and 2,920,501.

The polyurethane reactive adhesive mixtures of the present invention vary their viscosity at room temperature according to the viscosity and melting point or range of the starting components and the nature and quantity of the fillers added. These reactive adhesive mixtures are suspensions of a solid polyisocyanate, stabilized by an envelope of polyadduct, in the polyol and polyamine component.

In general, the finely ground polymer particles are added with continuous stirring at room temperature or moderately elevated temperature below 50° C. to a suspension of a retarded polyisocyanate in a mixture of low molecular weight polyhydroxy and/or polyamino compounds having a viscosity (determined according to DIN 53 019 at room temperature) of from 0.1 to 250 Pa.s, preferably from 0.1 to 10 Pa.s, until a macroscopically homogeneous mass is obtained. Mechanical stirrers and mixers with rotating stirrer elements such as anchor blade or spiral stirrers or Z- or sigma-kneaders are suitable for preparing relatively large quantities of the mixtures according to the invention.

The mixtures according to the invention are applied at temperatures below 50° C., preferably at room temperature, to one or both of the parts to be joined together. Application temperatures above 50° C. may be employed if the reactivity and thermostability of the mixtures permit such temperatures.

A supply of heat is generally necessary for producing the final strength of the bonds. This means increasing the temperature in the adhesive joint to a level above that indicated by the user, depending on the formulation and on the materials of the parts to be joined, and maintaining this higher temperature for a certain length of time, generally from 10 seconds to 60 minutes, and preferably from 30 seconds to 20 minutes.

The temperature employed during the curing period must in all cases exceed the formulation specific "thickening temperature" of the retarded polyisocyanate as described in German Auslegeschrift 3,403,499. By "thickening temperature" is meant the temperature range below which a one component polyurethane reactive mixture remains stable in storage without increase in viscosity and in a suitable working state for at least one hour and above which polyaddition begins to proceed within less than 60 minutes with a marked increase in viscosity. This temperature range generally covers 3° to 5° C. although it may be as much as 10° C.

The materials to be bonded by the adhesive mixtures according to the invention may be metals, glass, ceramics, wood and wood products. Thermostable plastics such as polyesters, ABS, polycarbonate, polyphenylene sulphide and glass fiber reinforced resins may also be suitable to mention a few. The materials to be bonded may be prepared for bonding by methods known to the man skilled in the art e.g. by rubbing down or by etching. Unsuitable in principle are parts which have a melting, softening or decomposition temperature below the formulation specific thickening temperature.

The invention will now be described in more detail with the aid of the following Examples of embodiments. All the parts, ratios and percentages given in these Examples are parts by weight, ratios by weight and percentages by weight unless otherwise indicated.

EXAMPLES

Formation of the Bonds

SMC plates 4 mm in thickness, 20 mm in width and 40 mm in length are bonded together with an overlap of 10 mm by coating the overlapping surface of one SMC plate with the mixture according to the invention and placing the second plate, which may or may not coated by the adhesive, with the given overlap on the first plate. A third SMC plate of the same dimensions is used as support and as fixing aid to prevent changes in the overlap during curing. A spacer sheet 200 μ in thickness placed on this third SMC plate acts as an interlayer between the support and the SMC plate placed on it to ensure a constant thickness of adhesive joint of 200 μm.

Basic Adhesive Mixtures

Adhesive mixtures, hereinafter referred to as "Mixture 1", "Mixture 2", etc., are used as basic components for the incorporation of the polymeric particles according to the invention. Mixtures 1, 3, 4 and 5 have both hydroxyfunctional and amino functional components for the reaction with retarded polyisocyanates, Mixture 2 contains only hydroxy functional reactants and Mixture 6 only amino functional reactants. Mixtures 1 to 3 contain the same retarded polyisocyanates and Mixtures 4 and 5 also contain the same retarded polyisocyanates.

Mixture 1

10 parts of aerosil (Aerosil R 202, Degussa, silica acid made hydrophobic by reaction with trimethylchlorsilane) and 64.5 parts of a dimerized tolylene diisocyanate are added to a mixture of 55 parts of polyoxypropylene ether diol of molecular weight 550 which as been stated on 2,2-bis-(4-hydroxyphenyl)propane, 40 parts of a polyoxypropylene ether diamine (which has a molecular weight of about 1,000 and has been prepared by pressure amination with NH3 of a polyoxypropylene ether diol which has been started on 2,2-bis-(4-hydroxyphenyl)-propane), 5 parts of 2,4/2,6-diamino-3,5-diethyl toluene (isomeric ratio 65/35), 0.3 parts of 4,4'-diamino-3,3'-dimethyl-dicyclohexyl methane and 0.4 parts of lead-2-ethylhexanoate. After homogenization and degasification in a vacuum, a thixotropic suspension which is pourable at room temperature and has a thickening temperature of 76°-82° C. is obtained. Hardness after solidification about 76 Shore D.

Mixture 2

61.64 Parts of dimeric tolylene-2,4-diisocyanate are suspended at room temperature in a mixture of 268 parts of a polyoxypropylene ether diol of molecular weight 1000, 120 parts of a polyoxypropylene ether triol of molecular weight 450, 12 parts of ethylene glycol and 0.2 parts of lead-(II)bis-ethyl hexanoate (24% Pb). The suspension is heated to 120° C. with stirring. The dimeric tolylene-2,4-diisocyanate goes into solution and reacts with the polyol mixture within a few minutes (evidence by IR and viscosity increase). After 2 hours degasification at 90° C., a slightly opaque prelengthened polyol mixture having a viscosity of 35,000 mPas at 22° C. and 500 mPas at 70° C. is obtained.

2.0 parts of a polyoxypropylene ether triamine of molecular weight 438 is then added to the above described prelengthed, relatively high molecular weight polyol and 273.6 parts of dimeric tolylene-2,4-diisocyanate are suspended therein. After 1 hour's degasification at 50° C., a one component polyurethane adhesive compound which has a viscosity of 100,000 mPas at 23° C. and is stable in storage at room temperature is obtained. The adhesive hardens rapidly at 120° C. to form a tough, rigid polyurethane with a Shore D hardness of 70.

Mixture 3

20 Parts of hydrophobicized silica (Sipernat D 17, Degussa AG), 8 parts of K-Al silicate, 3 Angstrom(-Bayloth ®L, Bayer AG, Leverkusen), and 22.79 parts of dimeric tolylene-2,4-diisocyanate are added to a mixture of 100 parts of a polyoxypropylene oxyethylene ether triol end blocked with 13.4% of ethylene oxide and having a molecular weight of about 6000, 6 parts of 2,4/2,6-diamino-3,5-diethyl toluene (ratio of isomers 65/35), 0.34 parts o 4,4'-diamino-3,3-dimethyldicyclohexylmethane, 0.2 parts of Pb-2-ethyl hexanoate (see Mixture 1) and 0.1 part of 2-ethylhexanoic acid. After homogenization and degasification in a vacuum, a suspension having a thickening temperature of 71°-76° C. and a viscosity of about 30 Pa.s/23° C. is obtained. After curing at 120° C., the Shore A hardness is about 88.

Mixture 4

66.67 Parts of finely powdered 3,3'-diisocyanato-4,4'-dimethyl-N,N'-diphenyl urea prepared by the process according to German Offenlegungsschrift 3,638,148 are added to a mixture of 78 parts of an aromatic amino polyether (obtained by the reaction of a mixture of 35.3% by weight of a polyoxypropylene ether diol having a molecular weight of about 2000, 31.4% by weight of a polyoxypropylene ether triol started on trimethylol propane and having a molecular weight of about 3000, 33.3% by weight of a polyoxypropylene-oxyethylene-ether triol started on glycerol and having a molecular weight of about 5000 and tolylene diisocyanate in an equivalent ratio of NCO/OH of 2:1, using the method of preparation according to German Auslegeschrift 2,948,419), 14.5 parts of a polyoxyethylene ether triol of molecular weight about 700 started on trimethylol propane, 7.5 parts of diethylene glycol, 1.0 part of 4,4'-diamino-3,3'-dimethyl-dicyclohexyl methane and 0.1 part of Sn-II-bis-2-ethyl-hexanoate. After homogenization and degasification, a suspension having a thickening temperature of 85°-95° C. is obtained. The hardness after curing at 150° C. is 70 Shore D.

Mixture 5

2.0 parts of diethylene triamine are added to 100 parts of a polyoxypropyleneoxyethylene ether-triol containing 17.6% by weight of ethylene oxide and having a molecular weight of about 6000, and 5.05 parts of tolylene-2,4-diisocyanate are added to this mixture with rapid stirring. After 30 minutes of heating to 100° C., 0.01 parts of Pb-2-ethyl hexanoate (see Mixture 1) are added with slow stirring and the temperature is maintained at 100° C. for a further 30 minutes under a vacuum with slow stirring. A polyether triol which has been rendered highly thixotropic is obtained, 3 parts of aerosil (Aerosil R 202, Degussa), 6 parts of K-Al-silicate (3 A), 1.57 parts of dimeric tolylene 2,4-diisocyanate and 17.85 parts of pulverulent 3,3'-diisocyanato-4,4'-dimethyl-N,N'-diphenyl urea described in German Offenlegungsschrift 3,638,148 are added in succession to a mixture of 53 parts of the above mentioned thixotropic polyether triol, 50 parts of a polyoxypropylene ether triamine of molecular weight about 5300 which has been started on trimethylol propane, 2 parts of 2,4/2,6-diamino-3,5-diethyl toluene (isomeric ratio 65/35), 1.0 part of Pb-2-ethyl hexanoate (see Mixture 1) and 0.2 parts of 4,4'-diamino-3,3'-dimethyl-dicyclohexyl methane. After homogenization and degasification, a thixotropic suspension having a thickening temperature of 72°-75° C. is obtained. The hardness after solidification at 120° C. is 90 Shore A.

Mixture 6

27.5 parts of finely milled naphthylene-1,5-diisocyanate (particle size < 40 μm) are added to a mixture of 100 parts of a polyoxypropylene ether diamine having a molecular weight of about 1000 and started on 2,2-bis-(4-hydroxyphenyl)propane and 1.0 part of 4,4-diamino-3,3'-dimethyl-dicyclohexyl methane. After homogenization and degasification in a vacuum, a suspension having a thickening temperature of 72°-77° C. is obtained. The hardness after solidification at 120° C. is 50 Shore D.

Mixtures of the above described Mixtures 1–6 with finely ground polymer particles having particle sizes of about 100 μ, described below under P1 to P5, are then used as adhesives.

P1: A hydroxypolyurethane having a molecular weight Mw about 100,000 based on substantially linear OH — polyesters based on adipic acid hexane diol-1,6 and butandiol-1,4, prolonged with methylene-diphenyl-4,4'-diisocyanate.

P2: Copolyamide based on lauryl lactam having a melting range of from 115° to 119° C. and a melt index according to DIN 53 735 of 100 g/10 min at 160° C.

P3: Ethylene/vinyl acetate copolymer containing about 30% of vinyl acetate and having a melt index according to DIN 53 735 of 25 g/10 min at 180° C.

P4: Ethylene/vinyl acetate/vinyl alcohol copolymer containing about 1 to 2% by weight of vinyl acetate.

P5: Acrylonitrile/butadiene/styrene copolymer having a polybutadiene content of 50% by weight and a graft shell of acrylonitrile/styrene, molecular weight about 100,000 and melting range with exclusion of oxygen > 260° C.

The adhesive mixtures are prepared by adding the particles to the previously prepared mixtures (i.e., Mixtures 1, 2, etc.) with continuous mixing at room temperature. The adhesives thus prepared are identified by the term "formulation" in the following table:

| Formulation | Mixture Number | % by weight of Polymer Pn |
|---|---|---|
| 1 | 1 | — |
| 2 | 2 | — |
| 3 | 3 | — |
| 4 | 4 | — |
| 5 | 5 | — |
| 6 | 6 | — |
| 7 | 1 | 10, P1 |
| 8 | 1 | 10, P2 |
| 9 | 1 | 10, P4 |
| 10 | 1 | 10, P5 |
| 11 | 2 | 10, P1 |
| 12 | 2 | 10, P2 |
| 13 | 2 | 10, P3 |
| 14 | 2 | 10, P4 |
| 15 | 2 | 10, P5 |
| 16 | 3 | 10, P1 |
| 17 | 3 | 10, P2 |
| 18 | 3 | 10, P4 |
| 19 | 3 | 10, P5 |
| 20 | 3 | 10, P5 |
| 21 | 4 | 10, P1 |
| 22 | 4 | 10, P2 |
| 23 | 4 | 10, P4 |
| 24 | 4 | 10, P5 |
| 25 | 5 | 10, P1 |
| 26 | 5 | 10, P5 |
| 27 | 6 | 10, P1 |
| 28 | 6 | 10, P2 |
| 29 | 6 | 10, P4 |
| 30 | 6 | 10, P5 |

The test samples prepared by the methods of application indicated above are cured at 130° C. in a circulating air oven for 30 minutes. The cured samples are left to cool in air and then stored at room temperature for 24 hours.

Tests for Adhesiveness

The adhesiveness is tested in a tension testing machine according to DIN 51 221 based on DIN 53 283, using SMC-109 test samples having the dimensions indicated above. The results obtained are average values from 5 tests.

Heat Resistance under Load

To measure the heat resistance under load, the test samples prepared by the processes described above are tested in a Eurotherm T-5060-E circulating air oven manufactured by Heraeus (Hanau), using a constant tension load of 20 N/cm$^2$ on the overlapping surface, beginning at 40° C. and heating to raise the temperature at the rate of 30° C. per hour. The heat resistance under load is the temperature at which the bonded parts separate. The results obtained are average values from 5 measurements.

| Results of Adhesiveness Tests | | | |
|---|---|---|---|
| Formulation | Shear Tension Strength (N/mm$^2$) | Formulation | Shear Tension Strength (N/mm$^2$) |
| 1 | 9.0 | 16 | 5.4 |
| 2 | 7.5 | 17 | 5.7 |
| 3 | 4.9 | 18 | 6.9 |
| 4 | 8.3 | 19 | 7.3 |
| 5 | *4.3 | 20 | 6.6 |
| 6 | 6.6 | 21 | 10.0 |
| 7 | 11.1 | 22 | 8.7 |
| 8 | 10.2 | 23 | 9.4 |
| 9 | 11.5 | 24 | 10.1 |
| 10 | 10.8 | 25 | *5.7 |
| 11 | 8.4 | 26 | *5.0 |
| 12 | 8.4 | 27 | 7.9 |
| 13 | 8.6 | 28 | 7.4 |
| 14 | 8.0 | 29 | 6.4 |
| 15 | 9.0 | 30 | 7.3 |

* = cured at 140° C./30 min.

| Results of Heat Resistance Under Load | | | |
|---|---|---|---|
| Formulation | Heat Resistance under load (°C.) | Formulation | Heat Resistance under load (°C.) |
| 1 | 173 | 14 | 178 |
| 2 | 169 | 17 | 199 |
| 3 | 190 | 19 | 201 |
| 4 | 187 | 23 | 191 |
| 5 | *161 | 27 | 180 |
| 6 | 178 | 28 | 183 |
| 7 | 176 | 29 | 183 |
| 9 | 180 | 30 | 180 |
| 10 | 180 | | |

* = cured at 140° C./30 min.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane reactive adhesive compound comprising:
    A) one or more polyisocyanates having an inactivated particle surface,
    B) at least one isocyanate reactive compound having a molecular weight $MG_w$ greater than 400, and
    C) finely dispersed polymer particles, wherein the polymer is solid at temperatures below 70° C. and has a molecular weight $MG_w$ of at least 3000, and is selected from the group consisting of a linear hydroxypolyurethane, a copolyamide, a copolymer of α-olefins, a polyvinyl alcohol, a polyvinyl formal, a polyvinyl acetal, a substantially linear polyester, a copolymer of acrylonitrile, butadiene and styrene having a polybutadiene content of 0.1 50% by weight, a (co)polymer of polyvinyl chloride, polyethylene, a copolymer of styrene and acrylonitrile.

2. The adhesive compound of claim 1 wherein said polymer particles have average particle diameters of from 100 to 500 μm.

3. The adhesive compound of claim 1 wherein at least 99% by weight of said polymer particles have an average particle diameter of at least 0.25 μm.

4. The adhesive compound of claim 1 wherein said polymer is a substantially linear hydroxypolyurethanes produced by reacting i) linear-polyethers and/or polyesters and/or polyether esters with ii) aromatic polyisocyanates.

5. The adhesive compound of claim 1 wherein said polymer is a copolyamide based on caprolactam and/or lauryl lactam or on caprolactam and dimeric fatty acids.

6. The adhesive compound of claim 1 wherein said polymer is selected from the group consisting of copolymers of α-olefines, polyvinyl formals, acrylonitrile/butadiene/styrene copolymers and substantially linear polyesters.

7. The adhesive compound of claim 1 wherein said polyisocyanate A) is a solid, finely divided polyisocyanates having a melting point above 80° C. in which from 0.1 to 25 equivalents % of the isocyanate groups are inactivated.

8. The adhesive compound of claim 1 wherein the isocyanate reactive compounds B) contained therein are polyols and/or polyamines.

9. The adhesive compound of claim 1 further containing one or more chain lengthening agents having a molecular weight below 400.

10. In a process for bonding substrates with a polyurethane reactive adhesive by applying said adhesive to one or both of the substrates to be bonded, bringing the thus coated substrates together, and curing said reactive adhesive mixture, the improvement wherein said adhesive is the adhesive compound of claim 1.

* * * * *